(12) United States Patent
Kakihara

(10) Patent No.: US 7,724,643 B2
(45) Date of Patent: May 25, 2010

(54) RECOVERY OF DUPLEX DATA SYSTEM AFTER POWER FAILURE

(75) Inventor: Koji Kakihara, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 946 days.

(21) Appl. No.: 11/215,043

(22) Filed: Aug. 31, 2005

(65) Prior Publication Data

US 2006/0056321 A1    Mar. 16, 2006

(30) Foreign Application Priority Data

Sep. 13, 2004    (JP) ............................. 2004-265388

(51) Int. Cl.
- H04L 12/26 (2006.01)
- G06F 13/00 (2006.01)
- G06F 11/00 (2006.01)

(52) U.S. Cl. .................. 370/216; 370/242; 370/250; 711/111; 714/100

(58) Field of Classification Search ................ 370/276, 370/216–228, 241–252; 711/161, 162, 111–114; 714/1–57, 100
See application file for complete search history.

(56) References Cited

U.S. PATENT DOCUMENTS

| | | | | |
|---|---|---|---|---|
| 5,341,493 | A * | 8/1994 | Yanai et al. | 711/161 |
| 5,544,347 | A * | 8/1996 | Yanai et al. | 711/162 |
| 5,559,957 | A * | 9/1996 | Balk | 714/23 |
| 5,828,823 | A | 10/1998 | Byers et al. | |
| 5,889,933 | A * | 3/1999 | Smith | 714/22 |
| 6,671,705 | B1 * | 12/2003 | Duprey et al. | 707/204 |
| 6,990,603 | B2 * | 1/2006 | Strasser | 714/6 |
| 7,065,610 | B1 * | 6/2006 | Black | 711/114 |
| 7,103,717 | B2 * | 9/2006 | Abe et al. | 711/114 |
| 7,124,244 | B2 * | 10/2006 | Shimada | 711/113 |
| 7,134,044 | B2 * | 11/2006 | Day et al. | 714/6 |
| 7,139,934 | B2 * | 11/2006 | Nakagawa et al. | 714/6 |
| 7,165,141 | B2 * | 1/2007 | Cochran et al. | 711/114 |
| 2004/0193658 | A1 * | 9/2004 | Kawamura et al. | 707/202 |
| 2004/0205312 | A1 * | 10/2004 | Zlotnick et al. | 711/162 |
| 2004/0205366 | A1 * | 10/2004 | Hung et al. | 713/340 |
| 2005/0066118 | A1 * | 3/2005 | Perry et al. | 711/112 |

FOREIGN PATENT DOCUMENTS

| | | |
|---|---|---|
| CN | 1466030 A | 7/2004 |
| JP | 56-129964 A | 10/1981 |
| JP | 1-133146 A | 5/1989 |
| JP | 03-006752 A | 1/1991 |
| JP | 07-271647 A | 10/1995 |
| JP | 11-338647 A | 10/1999 |
| KR | 10-0234634 B1 | 12/1999 |
| TW | 379825 | 1/2000 |
| TW | 577247 | 2/2004 |

* cited by examiner

Primary Examiner—Tri H Phan
(74) Attorney, Agent, or Firm—Sughrue Mion, PLLC

(57) ABSTRACT

A duplex data system performs a recovery process normally even in the event of an abrupt abnormal power failure. The duplex data system has a first storage device, a second storage device, and a control unit for duplicating data by storing the data in the first storage device and the second storage device. For duplicating the data, the control unit first writes the data into the first storage device and, after having completed the writing of the data into the first storage device, writes the data into the second storage device.

10 Claims, 7 Drawing Sheets

RECOVERY OF DUPLEX DATA SYSTEM AFTER POWER FAILURE

BACKGROUND OF THE INVENTION

1. Field of the Invention

The present invention relates to a dual data system for duplicating data to prevent the data from being erased and also to make the data highly reliable when the data are written in a storage device.

2. Description of the Related Art

Heretofore, there have been known in the art duplex data systems for duplicating data to be stored by writing the data into two storage devices such as hard disks for data protection in the event of a failure of one of the storage devices. See, for example, JP-A-1981-129964. It is the general practice to write the data simultaneously into the two storage devices.

When one of the storage devices becomes defective and fails to operate, the duplex data system can read the data from the other normal storage device. Therefore, when the power supply of the duplex data system is turned on next time, the duplex data system can be recovered using the data stored in the other normal storage device.

The conventional duplex data system is designed for use in a stationary apparatus such as a server or the like which is continuously supplied with electric energy from an uninterruptible power supply unit or the like. If the duplex data system is incorporated in a cell-powered portable terminal, the duplex data system does not expect abnormal power failures caused by the draining or removal of the cell, operator's erroneous actions, etc. while data are being simultaneously written into two storage devices in the portable terminal.

When the duplex data system suffers an abnormal power failure while data are being simultaneously written into the two storage devices, the two storage devices are turned off abnormally. At this time, the data that are being written into the two storage devices, and other data that have previously been stored in the two storage devices may possibly be destroyed. If both of the two storage devices malfunction due to data destruction or the like, then when the power supply of the duplex data system is turned on, the duplex data system cannot be recovered normally as no normal data can be read from any one of the storage devices.

SUMMARY OF THE INVENTION

It is an object of the present invention to provide a duplex data system which can be recovered normally even in the event of an abrupt power failure of a cell-powered portable terminal which incorporates the duplex data system.

A duplex data system according to the present invention includes first and second storage means, and means for writing data into the first and second storage means to duplicate the data by first writing the data into the first storage means and, after having completed the writing of the data into the first storage means, writing the data into the second storage means.

With the above arrangement, even if a power failure occurs at the instant data is being written, the data is written into one of the first and second storage means at the instant, and no data is being written into the other of the first and second storage means. Therefore, it is guaranteed that highly reliable data are being stored in the other of the first and second storage means. When the duplex data system is turned on next time, it can be recovered normally using the data stored in the other normal storage means. If the duplex data system is incorporated in a device such as a cell-powered portable terminal which tends to suffer an abnormal power failure caused by the draining or removal of the cell, operator's erroneous actions, etc. while data are being written, then the data stored in the device is protected and can reliably be used.

The duplex data system may further include a status table for describing therein statuses indicative of how data are written in the first and second storage means, and means for generating write flags representing whether data are written in the first and second storage means or not, and describing the generated write flags in the status table.

The duplex data system may further include means for determining whether a power failure has occurred or not while data are being written into the first and second storage means, based on the write flags described in the status table when the duplex data system is turned on after the duplex data system has suffered a power failure.

With the above arrangement, when the duplex data system is turned on again after it has suffered a power failure, it can easily be determined based on the write flags which one of the first and second storage means data was being written into when the power failure occurred.

The above and other objects, features, and advantages of the present invention will become apparent from the following description with reference to the accompanying drawings which illustrate examples of the present invention.

DESCRIPTION OF THE PREFERRED EMBODIMENTS

1st Embodiment

Figure 1A:
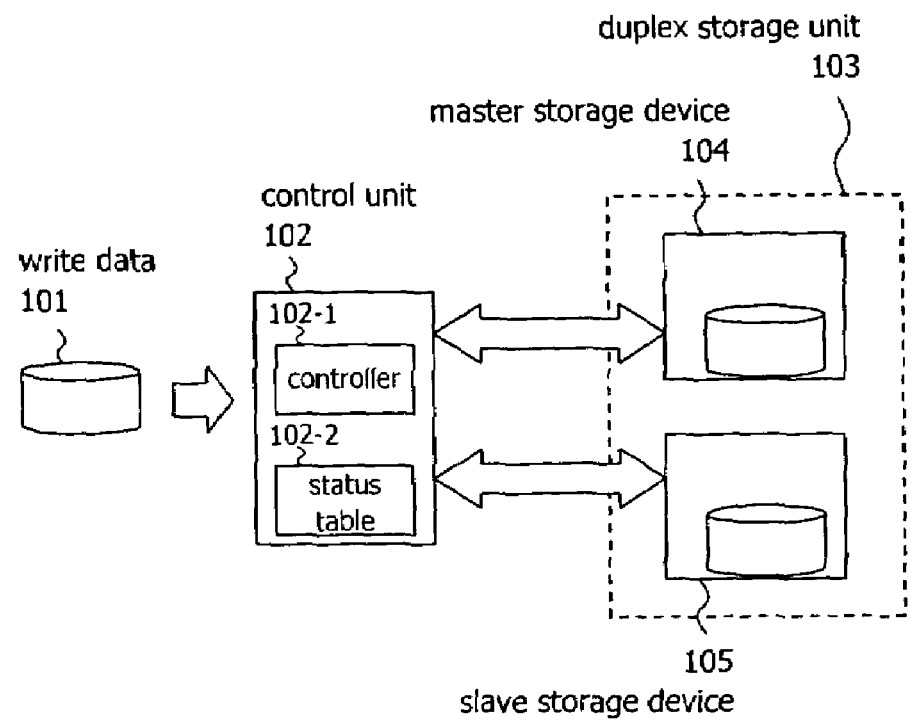
FIG. 1A is a block diagram of a duplex data system according to a first embodiment of the present invention.

As shown in FIG. 1A, a duplex data system according to a first embodiment of the present invention has duplex storage unit 103 having master storage device 104 and slave storage device 105, and control unit 102 including controller 102-1 for duplicating write data 101 by writing write data 101 into master storage device 104 and slave storage device 105.

Each of master storage device 104 and slave storage device 105 comprises a hard disk, a magnetic medium, a PC (Personal Computer) card, a CF (Compact Flash) card, an SD (Secure Digital) card, or the like which employs a semiconductor device.

For duplicating write data 101, controller 102-1 first writes write data 101 into master storage device 104. When the writing of write data 101 into master storage device 104 is completed, controller 102-1 writes write data 101 into slave storage device 105.

In this manner, controller 102-1 duplicates write data 101 by writing write data 101 successively into master storage device 104 and slave storage device 105. Even if the duplex data system suffers an abnormal power failure in the process of writing write data 101, the duplex data system is writing write data 101 into one of the storage devices and is not writing write data 101 into the other storage device at the instant of the abnormal power failure.

Therefore, the storage device which is not writing write data 101 at the time of the abnormal power failure does not suffer a trouble such as data destruction or the like, but is normal. The data that have been stored in the normal storage device are highly reliable and available for use. Consequently, when the power supply of the duplex data system is turned on next time, the duplex data system can be recovered using the data stored in the other normal storage device.

Control unit 102 also has status table 102-2 for indicating writing states of respective master storage device 104 and slave storage device 105. Specifically, controller 102-1 generates write flags representing whether write data 101 are being written or not with respect to respective master storage device 104 and slave storage device 105, and describes the generated write flags in status table 102-2.

Since controller 102-1 describes write flags representing whether write data 101 are being written or not with respect to respective master storage device 104, in status table 102-2, it can easily be determined from status table 102-2 which one of master storage device 104 and slave storage device 105 was writing write data 101 at the time of an abnormal power failure when the power supply of the duplex data system is turned on next time subsequent to the abnormal power failure.

Figure 1B:
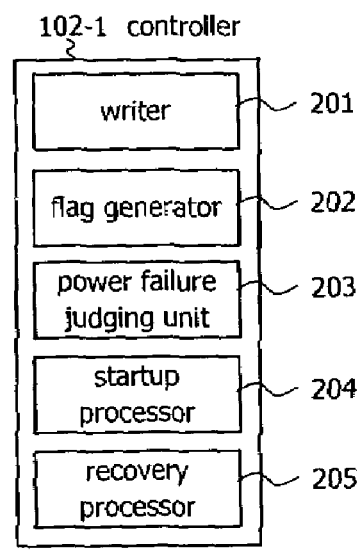
FIG. 1B is a block diagram of a controller of the duplex data system shown in FIG. 1A.

As shown in FIG. 1B, controller 102-1 has writer 201, flag generator 202, power failure judging unit 203, startup processor 204, and recovery processor 205.

For duplicating write data 101, writer 201 first writes write data 101 into master storage device 104. When the writing of write data 101 into master storage device 104 is completed, writer 201 writes write data 101 into slave storage device 105.

Flag generator 202 generates write flags representing whether write data 101 are being written or not with respect to respective master storage device 104 and slave storage device 105, and describes the generated write flags in status table 102-2.

Power failure judging unit 203 determines which one of master storage device 104 and slave storage device 105 was writing write data 101 at the time of an abnormal power failure based on the write flags described in status table 102-2 when the power supply of the duplex data system is turned on next time subsequent to the abnormal power failure.

Startup processor 204 performs a startup process. For example, startup processor 204 starts to operate the duplex data system using the data stored in one of master storage device 104 and slave storage device 105 which was not writing data at the time of an abnormal power failure when the power supply of the duplex data system is turned on next time subsequent to the abnormal power failure.

Recovery processor 205 performs a recovery process after startup processor 204 has started to operate the duplex data system when the power supply of the duplex data system is turned on next time subsequent to an abnormal power failure. Specifically, recovery processor 205 discards the data stored in one of master storage device 104 and slave storage device 105 which was writing data at the time of an abnormal power failure, and copies the data stored in the other storage device to the one storage device. Alternatively, recovery processor 205 logically disconnects and does not control one of master storage device 104 and slave storage device 105 which was writing data at the time of an abnormal power failure, and, at a certain subsequent time, copies the data stored in the other storage device to the one storage device.

Operation of the duplex data system according to the first embodiment of the present invention will be described in detail below.

Figure 2:
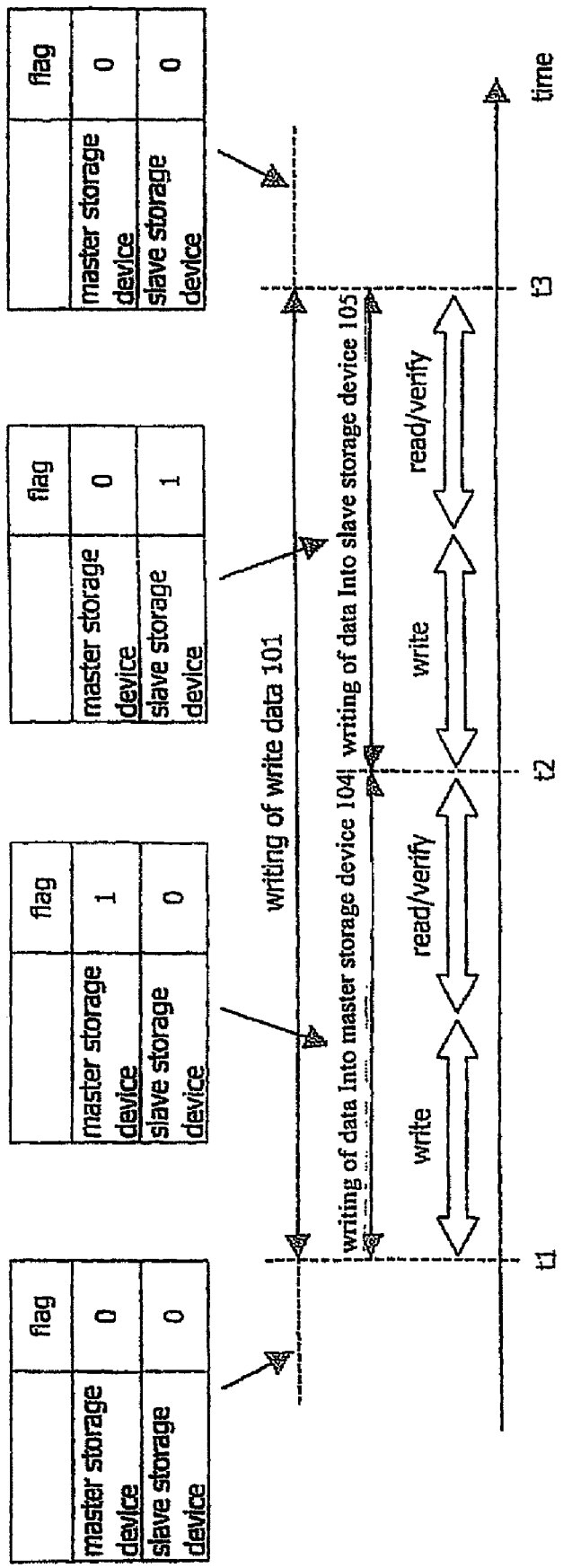
FIG. 2 is a timing chart of an operation sequence of the controller shown in FIG. 1A to write single data and an operation sequence of the controller to describe write flags in a status table.

(a) Mode of Operation for Writing Single Data:

An operation sequence of controller 102-1 to write single data into master storage device 104 and slave storage device 105 and an operation sequence of controller 102-1 to describe write flags in status table 102-2 will first be described below with reference to FIG. 2. FIG. 2 is a timing chart of a process of writing write data 101 and also shows write flags stored in status table 102-2 at various times in the timing chart.

Controller 102-1 generates write flags with respect to respective master storage device 104 and slave storage device 105, and describes the generated write flags in status table 102-2. It is assumed below that controller 102-1 sets the write flags to "1" when write data 101 is being written and sets write flags to "0" when write data 101 is not being written.

In FIG. 2, the period prior to time t1 is a period before write data 101 starts being written. In this period, therefore, controller 102-1 sets the write flags to "0" with respect to both master storage device 104 and slave storage device 105.

At time t1, controller 102-1 starts writing write data 101 into master storage device 104. At time t2, controller 102-1 completes the writing of write data 101 into master storage device 104. In the period from time t1 to time t2, controller 102-1 is writing write data 101 into master storage device 104. During this period, therefore, controller 102-1 sets the write flag to "1" with respect to master storage device 104 only. While controller 102-1 is writing write data, controller 102-1 operates in a read/verify cycle after a write cycle, checking whether the data is being written normally or not.

When controller 102-1 completes the writing of write data 101 into master storage device 104 at time t2, controller 102-1 starts writing write data 101 into slave storage device 105. At time t3, controller 102-1 completes the writing of write data 101 into slave storage device 105. In the period from time t2 to time t3, controller 102-1 is writing write data 101 into slave storage device 105. During this period, therefore, controller 102-1 sets the write flag to "1" with respect to slave storage device 105 only.

When controller 102-1 completes the writing of write data 101 into slave storage device 105 at time t3, controller 102-1 resets the write flags to "0" with respect to both master storage device 104 and slave storage device 105 in the period subsequent to time t3.

(b) Mode of Operation After an Abnormal Power Failure Occurs Before or After Single Data is Written or While Single Data is Being Written:

A mode of operation of controller 102—after an abnormal power failure occurs before or after single data 101 is written or while single data 101 is being written will be described below with reference to FIG. 2. As described above, if the duplex data system is incorporated in a cell-powered portable terminal, an abnormal power failure may occur due to the draining or removal of the cell, operator's erroneous actions, etc.

When the power supply of the duplex data system is turned on next time after an abnormal power failure, controller 102-1 checks the write flags described in status table 102-2. If the write flag with respect to either one of master storage device 104 and slave storage device 105 is "1", then controller 102-1 judges that the abnormal power failure occurred while the storage device with the write flag set to "1" was writing write data 101 and the writing of write data 101 into that storage device was not finished normally, and subsequently operates accordingly. After the abnormal power failure, controller 102-1 operates differently depending on when the abnormal power failure occurred in the timing chart shown in FIG. 2. Therefore, these different modes of operation of controller 102-1 will be described separately below.

(1) When the Abnormal Power Failure Occurred in the Period Subsequent to Time t3 in FIG. 2:

In the period subsequent to time t3, the writing of write data 101 into either one of master storage device 104 and slave storage device 105 has been completed normally. Regardless of the abnormal power failure that occurred in the period subsequent to t3, consequently, the data stored in master storage device 104 and slave storage device 105 are reliable and available for use. In this case, controller 102-1 adopts rules for preferentially using the data stored in master storage device 104, and starts to operate the duplex data system using the data stored in master storage device 104 when the power supply of the duplex data system is turned on next time.

(2) When the Abnormal Power Failure Occurred in the Period Between Times t2, t3 in FIG. 2:

In the period between times t2, t3, write data 101 is being written into slave storage device 105. If an abnormal power failure occurs in this period, then not only write data 101 that is being written into slave storage device 105, but also other data that have been stored in slave storage device 105 may possibly be destroyed or otherwise suffer trouble. On the other hand, master storage device 104 is not suffering trouble because the writing of write data 101 into master storage device 104 immediately prior to the period between times t2, t3 has been completed normally. Therefore, even if an abnormal power failure occurs in this period, the data that have been stored in master storage device 104 are highly reliable and available for use. In this case, controller 102-1 performs the process described below using the data stored in master storage device 104 when the power supply of the duplex data system is turned on next time.

When the power supply of the duplex data system is turned on next time, controller 102-1 starts to operate the duplex data system using the data stored in master storage device 104. Then, controller 102-1 discards the data stored in slave storage device 105, copies the data stored in master storage device 104 to slave storage device 105, making the data stored in master storage device 104 and the data stored in slave storage device 105 identical to each other thereby to synchronizing the data (recovery process).

(3) When the Abnormal Power Failure Occurred in the Period Between Times t1, t2 in FIG. 2:

In the period between times t1, t2, write data 101 is being written into master storage device 104. If an abnormal power failure occurs in this period, then not only write data 101 that is being written into master storage device 104, but also other data that have been stored in master storage device 104 may possibly be destroyed or otherwise suffer trouble. On the other hand, since write data 101 is written into slave storage device 105 after it has been written into master storage device 104, the writing of write data 101 into slave storage device 105 has not yet been performed, and no trouble occurs in slave storage device 105. Therefore, even if an abnormal power failure occurs in this period, the data that have been stored in slave storage device 105 are highly reliable and available for use. In this case, controller 102-1 performs the process described below using the data stored in slave storage device 105 when the power supply of the duplex data system is turned on next time.

When the power supply of the duplex data system is turned on next time, controller 102-1 starts to operate the duplex data system using the data stored in slave storage device 105. Then, controller 102-1 discards the data stored in master storage device 104, copies the data stored in slave storage device 105 to master storage device 104, making the data stored in master storage device 104 and the data stored in slave storage device 105 identical to each other thereby to synchronize the data (recovery process). Thereafter, controller 102-1 writes write data 101 successively into master storage device 104 and slave storage device 105 in the order named.

(4) When the Abnormal Power Failure Occurred in the Period Prior to Time t1:

In the period prior to time t1, write data 101 is yet to be written into master storage device 104 and slave storage device 105. Therefore, even if an abnormal power failure occurs in this period, the data that have been stored in master storage device 104 and slave storage device 105 are highly reliable and available for use. In this case, controller 102-1 adopts rules for preferentially using the data stored in master storage device 104, and performs the process described below using the data stored in master storage device 104 when the power supply of the duplex data system is turned on next time.

When the power supply of the duplex data system is turned on next time, controller 102-1 starts to operate the duplex data system using the data stored in master storage device 104. Thereafter, controller 102-1 writes write data 101 successively into master storage device 104 and slave storage device 105 in the order named.

(c) Mode of Operation for Writing Two Data:

An operation sequence of controller 102-1 to write two data A, B included in write data 101 into master storage device 104 and slave storage device 105 will be described below with reference to FIG. 3. It is assumed that two data A, B are successively written in the order named. When three or more data are being written, any possible abnormal power failure occurs at the instant one of the three or more data is being written. Therefore, an operation sequence of controller 102-1 to write three or more data can be described by the description of the operation sequence to write two data, and will not be described in detail below.

Figure 3:
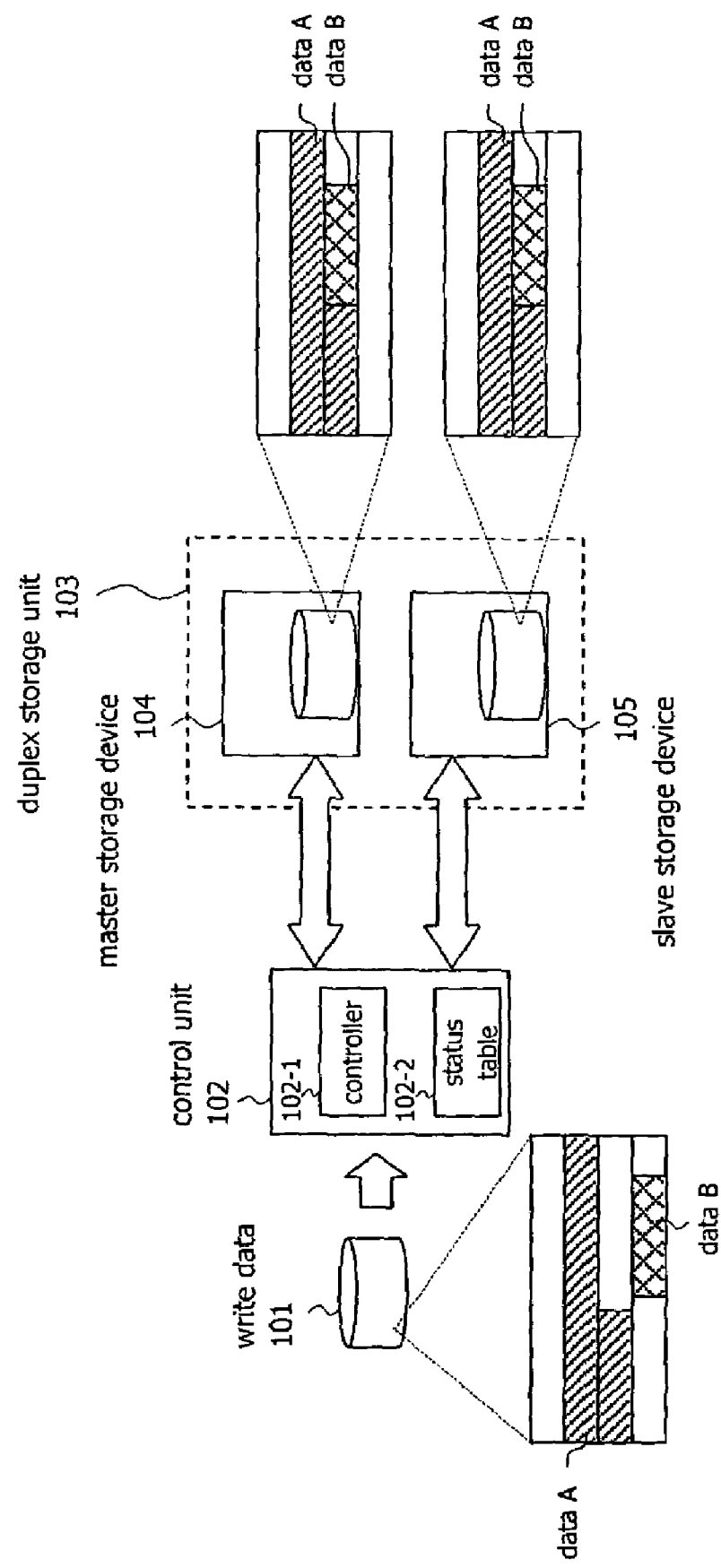
FIG. 3 is a block diagram showing the manner in which the controller shown in FIG. 1A writes two data.

As shown in FIG. 3, controller 102-1 writes data A into master storage device 104, and after having completed the writing of data A into master storage device 104, writes data A into slave storage device 105. Then, controller 102-1 writes data B into master storage device 104, and after having completed the writing of data B into master storage device 104, writes data B into slave storage device 105.

Figure 4:
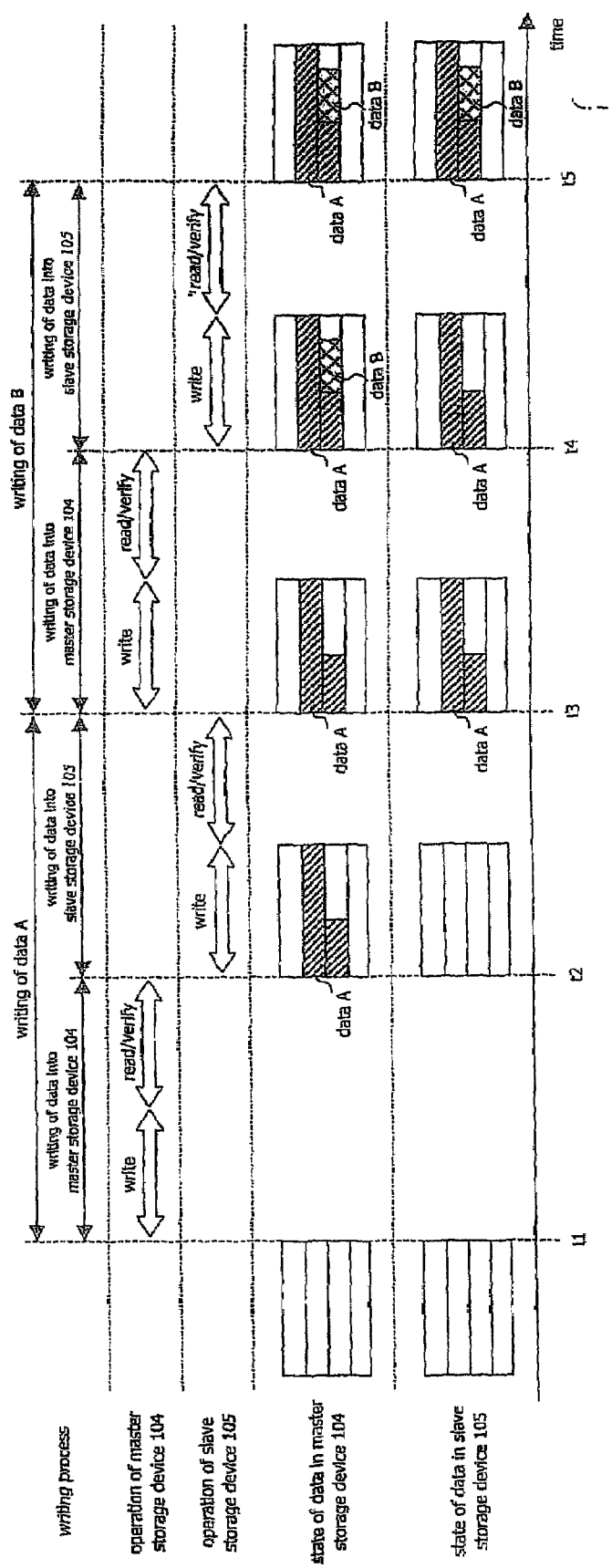
FIG. 4 is a timing chart of a detailed operation sequence of the controller shown in FIG. 1A to write two data.

The operation of controller 102-1 shown in FIG. 3 will be described in greater detail below with reference to FIG. 4. FIG. 4 is a timing chart of a detailed operation sequence of controller 102-1 to write two data A, B into master storage device 104 and slave storage device 105. FIG. 4 also shows the data stored in master storage device 104 and slave storage device 105 at various times in the timing chart.

In FIG. 4, the period prior to time t1 is a period before two data A, B start being written. In the period prior to time t1, therefore, no data at all is written in either one of master storage device 104 and slave storage device 105.

At time t1, controller 102-1 starts writing data A into master storage device 104. At time t2, controller 102-1 completes the writing of data A into master storage device 104. At time t2, therefore, data A has been written in master storage device 104.

When the writing of data A into master storage device 104 is completed at time t2, controller 102-1 starts writing data A into slave storage device 105. At time t3, controller 102-1 completes the writing of data A into slave storage device 105. At time t3, therefore, data A has been written in slave storage device 105.

The process of writing data A is now completed, and then the process of writing B is initiated.

At time t3, controller 102-1 starts writing data B into master storage device 104. At time t4, controller 102-1 completes the writing of data B into master storage device 104. At time t4, therefore, data B as well as data A has been written in master storage device 104.

When the writing of data B into master storage device 104 is completed at time t4, controller 102-1 starts writing data B into slave storage device 105. At time t5, controller 102-1 completes the writing of data B into slave storage device 105. At time t5, therefore, data A as well as data B has been written in slave storage device 105.

(d) Mode of Operation After an Abnormal Power Failure Occurs Before or After Two Data are Written or While Two Data are Being Written:

A mode of operation of controller 102-1 after an abnormal power failure occurs before or after two data A, B are written or while two data A, B are being written will be described below with reference to FIG. 4. After the abnormal power failure, controller 102-1 operates differently depending on when the abnormal power failure occurred in the timing chart shown in FIG. 4. Therefore, these different modes of operation of controller 102-1 will be described separately below.

(1) When the Abnormal Power Failure Occurred in the Period Subsequent to Time t5 in FIG. 2:

In the period subsequent to time t5, the writing of both data A, B into either one of master storage device 104 and slave storage device 105 has been completed normally. Regardless of the abnormal power failure that occurred in the period subsequent to t5, consequently, the data stored in master storage device 104 and slave storage device 105 are reliable and available for use. In this case, controller 102-1 adopts rules for preferentially using the data stored in master storage device 104, and starts to operate the duplex data system using the data stored in master storage device 104 when the power supply of the duplex data system is turned on next time.

(2) When the Abnormal Power Failure Occurred in the Period Between Times t4, t5 in FIG. 4:

In the period between times t4, t5, data B is being written into slave storage device 105. If an abnormal power failure occurs in this period, then not only data B that is being written into slave storage device 105, but also the data that have been stored in slave storage device 105 may possibly be destroyed or otherwise suffer trouble. On the other hand, master storage device 104 is not suffering trouble because the writing of data B into master storage device 104 immediately prior to the period between times t4, t5 has been completed normally.

Therefore, even if an abnormal power failure occurs in this period, the data that have been stored in master storage device 104 are highly reliable and available for use. In this case, controller 102-1 performs the process described below using the data stored in master storage device 104 when the power supply of the duplex data system is turned on next time.

When the power supply of the duplex data system is turned on next time, controller 102-1 starts to operate the duplex data system using the data stored in master storage device 104. Then, controller 102-1 discards the data stored in slave storage device 105, copies the data stored in master storage device 104 to slave storage device 105, making the data stored in master storage device 104 and the data stored in slave storage device 105 identical to each other thereby to synchronizing the data (recovery process). At this stage, the writing of data B into master storage device 104 and slave storage device 105 is completed.

Alternatively, when the power supply of the duplex data system is turned on next time, controller 102-1 starts to operate the duplex data system using the data stored in master storage device 104. Then, controller 102-1 disconnects slave storage device 105. Subsequently, at a suitable time after the maintenance of slave storage device 105 is finished, controller 102-1 copies the data stored in master storage device 104 to slave storage device 105, making the data stored in master storage device 104 and the data stored in slave storage device 105 identical to each other thereby to synchronizing the data (recovery process).

(3) When the Abnormal Power Failure Occurred in the Period Between Times t3, t4 in FIG. 4:

In the period between times t3, t4, data B is being written into master storage device 104. If an abnormal power failure occurs in this period, then not only data B that is being written into master storage device 104, but also data A that has been stored in master storage device 104 may possibly be destroyed or otherwise suffer trouble. On the other hand, since data B is written into slave storage device 105 after it has been written into master storage device 104, the writing of data B into slave storage device 105 has not yet been performed, but the writing of data A into slave storage device 105 immediately prior to the period between times t3, t4 has been completed normally, and no trouble occurs in slave storage device 105. Therefore, even if an abnormal power failure occurs in this period, the data that have been stored in slave storage device 105 are highly reliable and available for use. In this case, controller 102-1 performs the process described below using the data stored in slave storage device 105 when the power supply of the duplex data system is turned on next time.

When the power supply of the duplex data system is turned on next time, controller 102-1 starts to operate the duplex data system using the data stored in slave storage device 105. Then, controller 102-1 discards the data stored in master storage device 104, copies the data stored in slave storage device 105 to master storage device 104, making the data stored in master storage device 104 and the data stored in slave storage device 105 identical to each other thereby to synchronize the data (recovery process). Thereafter, controller 102-1 writes data A into master storage device 104 and then writes data A into slave storage device 105. Then, controller 102-1 writes data B successively into master storage device 104 and slave storage device 105 in the order named.

Alternatively, when the power supply of the duplex data system is turned on next time, controller 102-1 starts to operate the duplex data system using the data stored in slave storage device 105. Then, controller 102-1 disconnects master storage device 104. Then, controller 102-1 successively writes data A, B into slave storage device 105. Subsequently, at a suitable time after the maintenance of master storage device 104 is finished, controller 102-1 copies the data stored in slave storage device 105 to master storage device 104, making the data stored in master storage device 104 and the data stored in slave storage device 105 identical to each other thereby to synchronizing the data (recovery process).

(4) When the Abnormal Power Failure Occurred in the Period Between Times t2, t3 in FIG. 4:

In the period between times t2, t3, data A is being written into slave storage device 105. If an abnormal power failure occurs in this period, then not only data A that is being written into slave storage device 105, but also other data that have been stored in slave storage device 105 may possibly be destroyed or otherwise suffer trouble. On the other hand, master storage device 104 is not suffering trouble because the writing of data A into master storage device 104 immediately prior to the period between times t2, t3 has been completed normally. Therefore, even if an abnormal power failure occurs in this period, the data that have been stored in master storage device 104 are highly reliable and available for use. In this case, controller 102-1 performs the process described below using the data stored in master storage device 104 when the power supply of the duplex data system is turned on next time.

When the power supply of the duplex data system is turned on next time, controller 102-1 starts to operate the duplex data system using the data stored in master storage device 104. Then, controller 102-1 discards the data stored in slave storage device 105, copies the data stored in master storage device 104 to slave storage device 105, making the data stored in master storage device 104 and the data stored in slave storage device 105 identical to each other thereby to synchronizing the data (recovery process). At this stage, the writing of data A into master storage device 104 and slave storage device 105 is completed. Then, controller 102-1 writes data B successively into master storage device 104 and slave storage device 105 in the order named.

Alternatively, when the power supply of the duplex data system is turned on next time, controller 102-1 starts to operate the duplex data system using the data stored in master storage device 104. Then, controller 102-1 disconnects slave storage device 105. Then, controller 102-1 writes data B into master storage device 104. Subsequently, at a suitable time after the maintenance of slave storage device 105 is finished, controller 102-1 copies the data stored in master storage device 104 to slave storage device 105, making the data stored in master storage device 104 and the data stored in slave storage device 105 identical to each other thereby to synchronizing the data (recovery process).

(5) When the Abnormal Power Failure Occurred in the Period Between Times t1, t2 in FIG. 4:

In the period between times t1, t2, data A is being written into master storage device 104. If an abnormal power failure occurs in this period, then not only data A that is being written into master storage device 104, but also other data that have been stored in master storage device 104 may possibly be destroyed or otherwise suffer trouble. On the other hand, since data A is written into slave storage device 105 after it has been written into master storage device 104, the writing of data A into slave storage device 105 has not yet been performed, and no trouble occurs in slave storage device 105 because the writing of other data into slave storage device 105 immediately prior to the period between times t1, t2 has been completed normally. Therefore, even if an abnormal power failure occurs in this period, the data that have been stored in slave storage device 105 are highly reliable and available for use. In this case, controller 102-1 performs the process described below using the data stored in slave storage device 105 when the power supply of the duplex data system is turned on next time.

When the power supply of the duplex data system is turned on next time, controller 102-1 starts to operate the duplex data system using the data stored in slave storage device 105. Then, controller 102-1 discards the data stored in master storage device 104, copies the data stored in slave storage device 105 to master storage device 104, making the data stored in master storage device 104 and the data stored in slave storage device 105 identical to each other thereby to synchronize the data (recovery process). Thereafter, controller 102-1 writes data A into master storage device 104 and then write data A into slave storage device 105. Then, controller 102-1 writes data B successively into master storage device 104 and slave storage device 105 in the order named.

Alternatively, when the power supply of the duplex data system is turned on next time, controller 102-1 starts to operate the duplex data system using the data stored in slave storage device 105. Then, controller 102-1 disconnects master storage device 104. Then, controller 102-1 successively writes data A, B into slave storage device 105. Subsequently, at a suitable time after the maintenance of master storage device 104 is finished, controller 102-1 copies the data stored in slave storage device 105 to master storage device 104, making the data stored in master storage device 104 and the data stored in slave storage device 105 identical to each other thereby to synchronizing the data (recovery process).

(6) When the Abnormal Power Failure Occurred in the Period Prior to Time t1:

In the period prior to time t1, data A, B are yet to be written into master storage device 104 and slave storage device 105. Therefore, even if an abnormal power failure occurs in this period, the data that have been stored in master storage device 104 and slave storage device 105 are highly reliable and available for use. In this case, controller 102-1 adopts rules for preferentially using the data stored in master storage device 104, and performs the process described below using the data stored in master storage device 104 when the power supply of the duplex data system is turned on next time.

When the power supply of the duplex data system is turned on next time, controller 102-1 starts to operate the duplex data system using the data stored in master storage device 104. Then, controller 102-1 writes data A successively into master storage device 104 and slave storage device 105 in the order named. Thereafter, controller 102-1 writes data B successively into master storage device 104 and slave storage device 105 in the order named.

(e) Mode of Operation for Using Either One of the Storage Devices Singly in the Duplex Storage Unit:

If an abnormal power failure occurs while data is being written into either one of master storage device 104 and slave storage device 105 and the storage device suffers trouble such as data destruction, then controller 102-1 logically disconnects the storage device which is suffering trouble, and uses the other trouble-free storage device singly. This mode of operation of controller 102-1 will be described below with reference to FIGS. 5A and 5B.

Figure 5A:
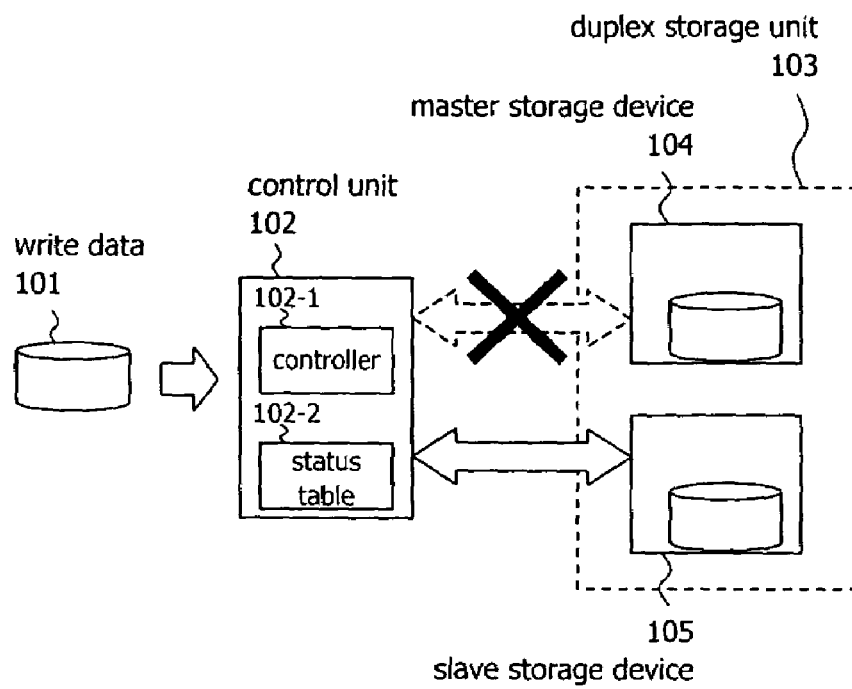
FIG. 5A is a block diagram showing the manner in which the controller shown in FIG. 1A uses a normal slave storage device only when a master storage device is suffering a failure.
Figure 5B:
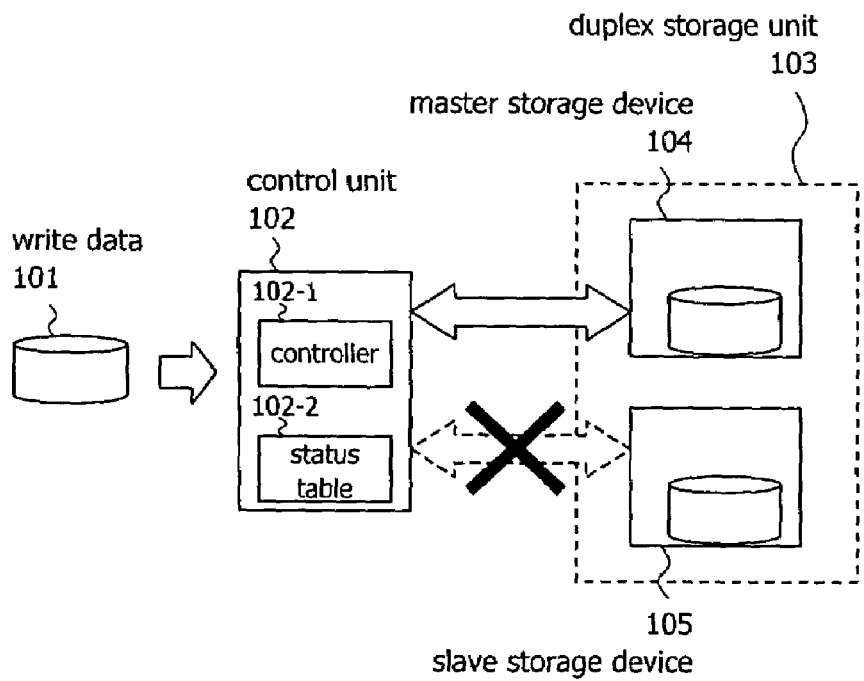
FIG. 5B is a block diagram showing the manner in which the controller shown in FIG. 1A uses a normal master storage device only when a slave storage device is suffering a failure.

FIG. 5A shows how controller 102-1 operates when master storage device 104 suffers trouble, and FIG. 5B shows how controller 102-1 operates when slave storage device 105 suffers trouble.

In FIGS. 5A and 5B, controller 102-1 is physically connected to both master storage device 104 and slave storage device 105. However, controller 102-1 logically disconnects and does not control a storage device which is suffering trouble such as data destruction on account of an abnormal power failure that has occurred while data is being written into the storage device.

2nd Embodiment

Figure 6:
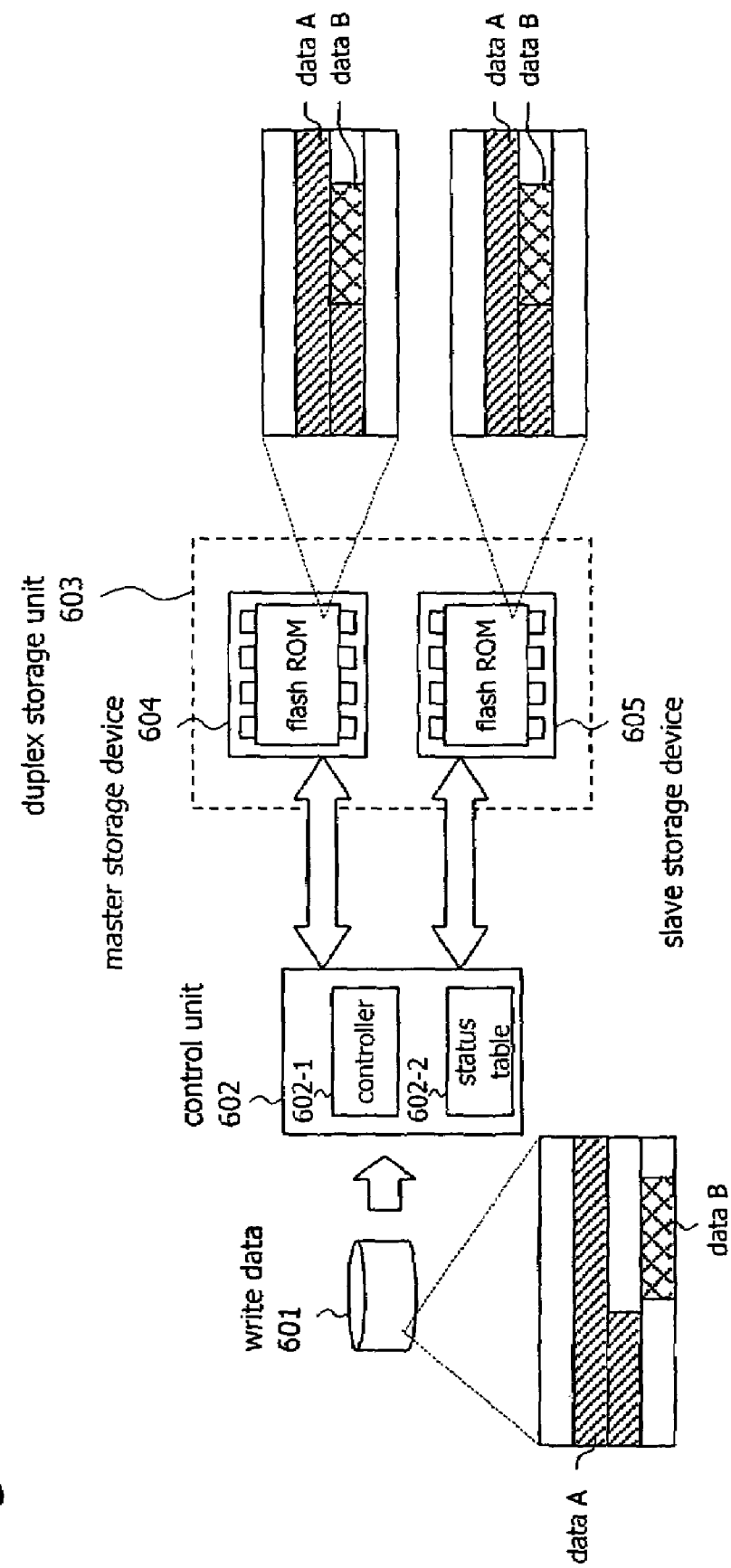
FIG. 6 is a block diagram of a duplex data system according to a second embodiment of the present invention.

FIG. 6 shows in block form a duplex data system according to a second embodiment of the present invention. As shown in FIG. 6, the duplex data system according to the second embodiment differs from the duplex data system according to the first embodiment shown in FIG. 1A in that it employs master storage device 604 and slave storage device 605, each comprising a flash ROM, instead of master storage device 104 and slave storage device 105, each comprising a hard disk or the like. Other basic details of the duplex data system according to the second embodiment are identical to those of the duplex data system according to the first embodiment. Specifically, write data 601, control unit 602, controller 602-1, status table 602-2, duplex storage unit 603, master storage device 604, and slave storage device 605 shown in FIG. 6 correspond respectively to write data 101, control unit 102, controller 102-1, status table 102-2, duplex storage unit 103, master storage device 104, and slave storage device 105 shown in FIG. 1A. A data duplicating process and a recovery process after an abnormal power failure according to the second embodiment are also identical to those according to the first embodiment.

3rd Embodiment

Figure 7:
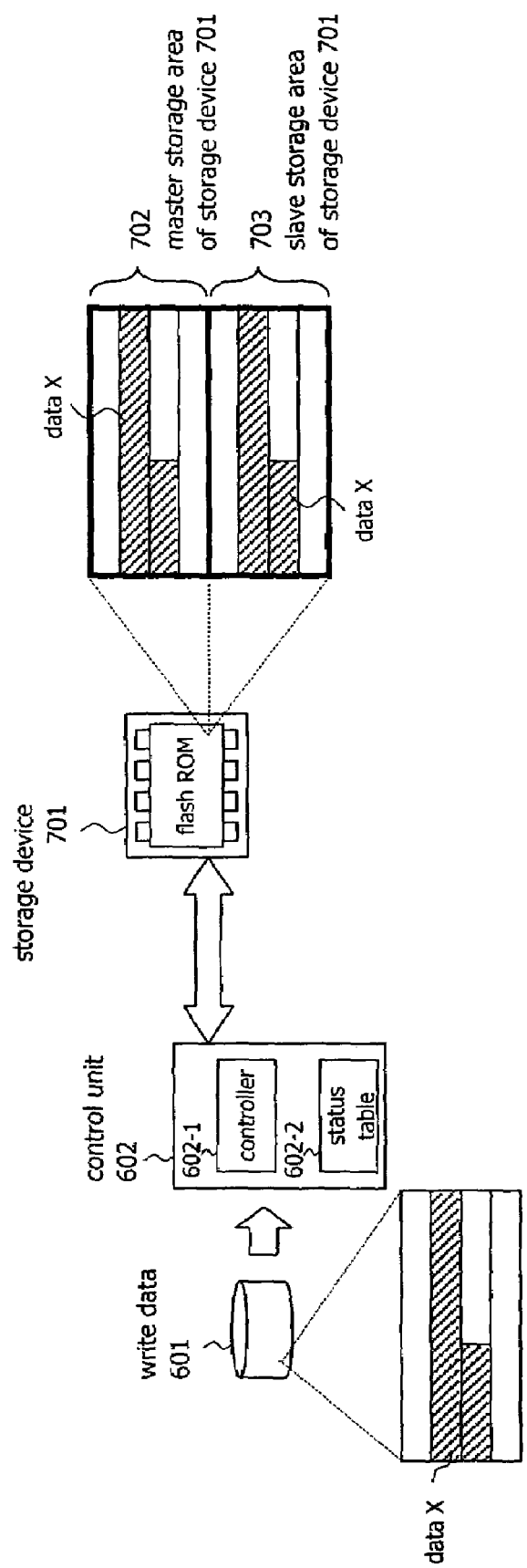
FIG. 7 is a block diagram of a duplex data system according to a third embodiment of the present invention.

FIG. 7 shows in block form a duplex data system according to a third embodiment of the present invention. As shown in FIG. 7, the duplex data system according to the third embodiment differs from the duplex data system according to the second embodiment shown in FIG. 6 in that it employs storage device 701, comprising a flash ROM, instead of master storage device 604 and slave storage device 605 shown in FIG. 6, storage device 701 having a storage area divided into master storage area 702 and slave storage area 703 for duplicating write data 601.

There is known a file system, typically an FAT (File Allocation Table) system, for writing data themselves and also writing storage locations of those data. According to the file system, if an abnormal power failure occurs in the file system while data is being rewritten in a storage medium which may comprise a hard disk, a magnetic medium, a PC card, a CF card, an SD card, or a flash ROM which employs a semiconductor device, then not only the data being written into the storage medium, but also all the data that have been stored in the storage medium cannot be read from the storage medium. Therefore, it is necessary to duplicate data in such a file system, using two storage devices according to the first and second embodiments.

Storage device 701 shown in FIG. 7 has no FAT and is accessible through fixed memory addresses. As shown in FIG. 7, the storage area of storage device 701 is divided into two storage areas, i.e., master storage area 702 and slave storage area 703 for duplicating data X. Since data X is written in storage device 701 at fixed memory addresses, even if an abnormal power failure occurs while data is being written, the entire data stored in storage device 701 is not destroyed though the abnormal power failure would otherwise destroy an FAT. The abnormal power failure destroys only the data that is being written into storage device 701 at the time of the abnormal power failure.

A data duplicating process and a recovery process after an abnormal power failure which are performed by the duplex data system according to the third embodiment are also identical to those according to the first and second embodiments.

Specifically, for writing data X, controller 602-1 first writes data X into master storage area 702, and after having completed the writing of data X into master storage area 702, writes data X into slave storage area 703.

If an abnormal power failure occurs while data X is being written into slave storage area 703, then since the writing of data X into master storage area 702 has already been completed, the data stored in master storage area 702 are highly reliable and available for use. In this case, controller 602-1 starts to process the duplex data system using the data stored in master storage area 702 when the power supply of the duplex data system is turned on next time. Controller 602-1 discards the data in stored in slave storage area 703, and then copies the data stored in master storage area 702 to slave storage area 703.

If an abnormal power failure occurs before data X is written into master storage area 702, then since data X is yet to be written into slave storage area 703 and slave storage area 703 is in a normal state, the data stored in slave storage area 703 highly reliable and available for use. In this case, controller 602-1 starts to process the duplex data system using the data stored in slave storage area 703 when the power supply of the duplex data system is turned on next time. Controller 602-1 discards the data stored in master storage area 702, and then copies the data stored in slave storage area 703 to master storage area 702.

The duplex data system according to the present invention is particularly suitable if incorporated in a device such as a cell-powered portable terminal which frequently tends to suffer an abnormal power failure while data is being written into a storage unit or device thereof due to the removal or draining of the cell, an operator's erroneous action to turn off the device while it is in use.

The duplex data system according to the present invention can employ a storage unit or device such as a hard disk, a magnetic medium, a PC card, a CF card, an SD card, or a flash ROM which employs a semiconductor device, or a storage area in a flash ROM as a storage unit or device. The duplex data system according to the present invention can also employ a storage area in a DRAM or an SRAM which is a volatile memory on the premise that a memory backup process is performed.

While preferred embodiments of the present invention have been described using specific terms, such description is for illustrative purposes only, and it is to be understood that changes and variations may be made without departing from the spirit or scope of the following claims.

What is claimed is:

1. A duplex data system comprising:
   first and second storage means that each store substantially all data in the duplex data system;
   means for writing data into said first and second storage means to store a copy of all data stored in the first storage means in the second storage means by writing the data into said first storage means and, after having completed the writing of the data into said first storage means, automatically and substantially immediately writing the data into said second storage means; and
   means for determining, when the data was being written to one of the first storage means and the second storage means at a time of a power failure to the duplex data system that removes power from the first and second storage means, which of the one of the first storage means and second storage means the data was being written to at the time of the power failure.

2. A duplex data system according to claim 1, further comprising:
a status table that indicates whether the data are currently being written in one of said first storage means and said second storage means; and
means for generating write flags that indicate whether data are currently being written in one of said first storage means and said second storage means, and for storing the generated write flags in said status table.

3. A duplex data system according to claim 2, wherein the means for determining determines which one of said first and second storage means data was being written to at the time of the power failure based on said write flags described in said status table when the duplex data system is turned on after the duplex data system has suffered the power failure.

4. A duplex data system according to claim 3, further comprising:
means for starting the duplex data system after the power failure has occurred while the data were being written to the one of said first storage means and said second storage means when the duplex data system is turned on after the duplex data system has suffered the power failure,
wherein said means for starting starts to operate the duplex data system using data stored in the other one of said first means and said second storage means into which data was being written at the time the power failure occurred determined by said means for determining.

5. A duplex data system according to claim 4, further comprising:
means for discarding data stored in said one of said first storage means and said second storage means determined by said means for determining when the duplex data system is turned on after the duplex data system suffered the power failure, and for copying the data stored in the other one of said first storage means and second storage means to said one of said first storage means and said second storage means determined by said means for determining.

6. The duplex data system according to claim 1, wherein the first storage means is a non-volatile storage means and the second storage means is a non-volatile storage means.

7. The duplex data system according to claim 1, wherein the first storage means is a hard disk drive and the second storage means is hard disk drive.

8. A duplex data system comprising:
first and second storage means that each store substantially all data in the duplex data system;
means for writing data into said first and second storage means to store a copy of all data stored in the first storage means in the second storage means by writing the data into said first storage means and, after having completed the writing of the data into said first storage means, automatically and substantially immediately writing the data into said second storage means;
a status table for describing therein statuses indicative of how data are written in said first and second storage means;
means for generating write flags representing whether data are written in said first and second storage means or not, and describing the generated write flags in said status table;
means for determining whether a power failure has occurred or not while data are being written into said first and second storage means, based on said write flags described in said status table when the duplex data system is turned on after the duplex data system has suffered a power failure;
means for starting to operate the duplex data system if it is judged that a power failure has occurred while data are being written into one of said first and second storage means when the duplex data system is turned on after the duplex data system has suffered a power failure; and
means for logically disconnecting and not controlling said one of said first and second storage means when the duplex data system is turned on after the duplex data system has suffered a power failure, and copying, at a predetermined subsequent time, the data stored in the other of said first and second storage means to said one of said first and second storage means,
wherein said means starts to operate the duplex data system using data stored in the other of said first and second storage means into which data are not being written when the power failure has occurred.

9. A method for safeguarding write data being written to a storage device in case of power failure occurring while the write data is being written to the storage device, the storage device including a master storage device and a slave storage device, for storing the write data, and a control unit for controlling the writing of the write data to the master storage device and the slave storage device, the method comprising:
writing the write data into the master storage device starting at a time one and ending at a time two;
setting a flag at the control unit at the time one indicating that the write data is being written into the master storage device;
writing the write data into the slave storage device starting at the time two and ending at a time three;
setting the flag at the control unit at the time two indicating that the write data is being written into the slave storage device;
checking the flag, after a power failure, to determine whether the write data was being written to either of the master storage device or the slave storage device during the power failure;
copying the write data, subsequent to the power failure, from the slave storage device to the master storage device if the flag indicates that the write data was being written to the master storage device during the power failure; and
copying the write data, subsequent to the power failure, from the master storage device to the slave storage device if the flag indicates that the write data was being written to the slave storage device during the power failure,
wherein both the master storage device and the slave storage device are non-volatile memory devices.

10. The method of claim 9, further comprising:
setting the flag at the control unit at the time three indicating that the write data is not being written into either the master storage device or the slave storage device; and
copying the write data, subsequent to the power failure, from the master storage device to the slave storage device.

* * * * *